(12) United States Patent
Hakola et al.

(10) Patent No.: US 11,432,338 B2
(45) Date of Patent: Aug. 30, 2022

(54) ENHANCEMENT ON RANDOM ACCESS CHANNEL OCCASION AND SS/PBCH BLOCK ASSOCIATION

(71) Applicant: Nokia Technologies Oy, Espoo (FI)

(72) Inventors: Sami-Jukka Hakola, Kempele (FI); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 17/082,960

(22) Filed: Oct. 28, 2020

(65) Prior Publication Data
US 2021/0136828 A1    May 6, 2021

Related U.S. Application Data

(60) Provisional application No. 62/930,642, filed on Nov. 5, 2019.

(51) Int. Cl.
*H04W 74/08* (2009.01)

(52) U.S. Cl.
CPC .............................. *H04W 74/0833* (2013.01)

(58) Field of Classification Search
CPC ........... H04W 74/0833; H04W 74/006; H04W 72/046; H04W 74/002; H04W 74/004; H04W 72/0413; H04B 7/0695; H04L 5/0023; H04L 5/0048; H04L 5/0094; H04L 5/0033
See application file for complete search history.

(56) References Cited

U.S. PATENT DOCUMENTS

| 2019/0132882 A1 | 5/2019 | Li et al. |
| 2019/0208550 A1 | 7/2019 | Ko et al. |

(Continued)

FOREIGN PATENT DOCUMENTS

WO    WO-2018031852 A1 *   2/2018    ........... H04B 7/0617

OTHER PUBLICATIONS

Extended European Search Report received for corresponding European Patent Application No. 20203054.0, dated Feb. 2, 2021, 12 pages.

(Continued)

*Primary Examiner* — Thai Nguyen
(74) *Attorney, Agent, or Firm* — Nokia Technologies Oy

(57) ABSTRACT

In accordance with an example embodiment of the present invention, a method comprising: receiving, by a user equipment of a communication network, information comprising a random access channel configuration and a number of cycled beams; determining a number of random access channel occasions for a random access channel occasion group; transforming synchronization signal blocks to a beam index given the number of cycled beams and associating beams with the number of random access channel occasions of the random access channel occasion group; identifying a random access channel occasion group associated with the beam index; selecting at least one preamble associated with the beam index in the random access channel occasion group; and transmitting the at least one preamble within each of the number of random access channel occasions of the random access channel occasion group to perform a random access channel procedure.

20 Claims, 9 Drawing Sheets

(56) References Cited

U.S. PATENT DOCUMENTS

2019/0268947 A1\* 8/2019 Zhang .................. H04L 5/0053
2020/0107235 A1\* 4/2020 Peisa ................... H04B 7/0695

OTHER PUBLICATIONS

"Enhancements To Initial Access Procedure", 3GPP TSG-RAN WG1 Meeting #97, R1-1907455, Agenda: 7.2.2.2.2, Ericsson, May 13-17, 2019, 14 pages.

"Discussion On Initial Access Signals And Channels", 3GPP TSG RAN WG1 #98, R1-1908137, Agenda: 7.2.2.1.1, vivo. Aug. 26-30, 2019, 13 pages.

"Feature Lead Summary On Initial Access Signals And Channels For NR-U", 3GPP TSG RAN WG1 Meeting #98, R1-1909814, Agenda: 7.2.2.1.1, Qualcomm Incorporated, Aug. 26-30, 2019, 49 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

"3rd Generation Partnership Project; Technical Specification Group Radio Access Network; NR; Physical channels and modulation (Release 15)", 3GPP TS 38.211, V15.7.0, Sep. 2019, pp. 1-97.

"New WID on NR-based Access to Unlicensed Spectrum", 3GPP TSG RAN Meeting #82, RP-182878, Agenda : 9.1.1, Qualcomm Inc., Dec. 10-13, 2018, 7 pages.

"Guidance on essential functionality for NR-U", 3GPP TSG RAN meeting #84, RP-191581, Agenda : 9.4.3, Qualcomm, Jun. 3-6, 2019, pp. 1-8.

"3rd Generation Partnership Project; Technical Specification Group Radio Access Network; NR; Physical layer procedures for control (Release 15)", 3GPP TS 38.213, V15.7.0, Sep. 2019, pp. 1-108.

"NR-U PRACH Design", 3GPP TSG RAN WG1 Ad-Hoc Meeting 1901, R1-1900239, Agenda : 7.2.2.1.1, Panasonic, Jan. 21-25, 2019, 8 pages.

"Initial Access and Mobility for NR-U", 3GPP TSG RAN WG1 #96, R1-1902041, Agenda : 7.2.2.2.2, LG Electronics, Feb. 25-Mar. 1, 2019, 22 pages.

"Summary of Remaining Details on Rach Procedure", 3GPP TSG-RAN WG1#NR1801, R1-180xxxx, Agenda : 7.1.4.2, Nokia, Jan. 22-26, 2018, 35 pages.

\* cited by examiner

| slot index #n | 0 | | 1 | | 2 | | 3 | | 4 | | 5 | | 6 | | 7 | | 8 | | 9 | |
|---|---|---|---|---|---|---|---|---|---|---|---|---|---|---|---|---|---|---|---|---|
| ssb index | 0 | 1 | 2 | 3 | 4 | 5 | 6 | 7 | 8 | 9 | 10 | 11 | 12 | 13 | 14 | 15 | 16 | 17 | 18 | 19 |
| PBCH DMRS seq | 0 | 1 | 2 | 3 | 4 | 5 | 6 | 7 | 0 | 1 | 2 | 3 | 4 | 5 | 6 | 7 | 0 | 1 | 2 | 3 |
| Q=1 beam index | 0 | 0 | 0 | 0 | 0 | 0 | 0 | 0 | 0 | 0 | 0 | 0 | 0 | 0 | 0 | 0 | 0 | 0 | 0 | 0 |
| Q=2 beam index | 0 | 1 | 0 | 1 | 0 | 1 | 0 | 1 | 0 | 1 | 0 | 1 | 0 | 1 | 0 | 1 | 0 | 1 | 0 | 1 |
| Q=4 beam index | 0 | 1 | 2 | 3 | 0 | 1 | 2 | 3 | 0 | 1 | 2 | 3 | 0 | 1 | 2 | 3 | 0 | 1 | 2 | 3 |
| Q=8 beam index | 0 | 1 | 2 | 3 | 4 | 5 | 6 | 7 | 0 | 1 | 2 | 3 | 4 | 5 | 6 | 7 | 0 | 1 | 2 | 3 |

FIG. 6A

ENHANCEMENT ON RANDOM ACCESS CHANNEL OCCASION AND SS/PBCH BLOCK ASSOCIATION

TECHNICAL FIELD

The teachings in accordance with the exemplary embodiments of this invention relate generally to a Random Access Channel (RACH) resource allocation and, more specifically, relate to a Random Access Channel (RACH) resource allocation for a repetition transmission mode and association to Synchronization Signal and PBCH blocks (SS/PBCH).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CB Channel Bandwidth
CORESET Control Resource Set
CSI-RS Channel State Information Reference Signal
DCI Downlink Control Information
DMRS Demodulation Reference Signal
DRS Discovery Reference Signal
FDM Frequency Division Multiplexing
gNB 5G Node B
LBT Listen-Before-Talk
MCS Modulation and Coding Scheme
PBCH Physical Broadcast Channel
PDCCH Physical Downlink Control Channel
PDSCH Physical Downlink Shared Channel
PRB Physical Resource Block
PSS Primary Synchronization Signal
QCL Quasi Co-Location
RACH Random Access Channel
RE Resource Element
RO RACH Occasion
RMSI Remaining Minimum System Information
SLIV Start and Length Indicator Value
SSB Synchronization Signal and PBCH Block
SSS Secondary Synchronization Signal
TDM Time Division Multiplexing
TDRA Time Domain Resource Allocation
UE User Equipment Random access in wireless systems are used to initiate and facilitate communication between user equipment (UE) and a network. The UE and the network which may include a base station (BS) interact for the random access, and to provide wireless communication services for the UE. Such random access procedures enables a UE to extract timing and frequency and/or phase information for timing and frequency synchronization.

Example embodiments of the invention at least work to improve such random access procedures in radio technologies including new radio (NR) radio technologies.

SUMMARY

Various aspects of examples of the invention are set out in the claims.

According to a first aspect of the present invention, a method comprising: receiving, by a user equipment of a communication network, information comprising a random access channel configuration and a number of cycled beams; determining a number of random access channel occasions for a random access channel occasion group; transforming synchronization signal blocks to a beam index given the number of cycled beams and associating beams with the number of random access channel occasions of the random access channel occasion group; identifying a random access channel occasion group associated with the beam index; selecting at least one preamble associated with the beam index in the random access channel occasion group; and transmitting the at least one preamble within each of the number of random access channel occasions of the random access channel occasion group to perform a random access channel procedure.

According to a second aspect of the present invention, an apparatus comprising: at least one processor; and at least one memory including computer program code, wherein the at least one memory and the computer program code are configured, with the at least one processor, to cause the apparatus to at least: receive information comprising a random access channel configuration and a number of cycled beams; determine a number of random access channel occasions for a random access channel occasion group; transform synchronization signal blocks to a beam index given the number of cycled beams and associate beams with the number of random access channel occasions of the random access channel occasion group; identify a random access channel occasion group associated with the beam index; select at least one preamble associated with the beam index in the random access channel occasion group; and transmit the at least one preamble within each of the number of random access channel occasions of the random access channel occasion group to perform a random access channel procedure.

According to a third aspect of the present invention, A non-transitory computer storage medium encoded with a computer program, the program comprising instructions that when executed by one or more computers cause the one or more computers to perform operations comprising: receiving information comprising a random access channel configuration and a number of cycled beams; determining a number of random access channel occasions for a random access channel occasion group; transforming synchronization signal blocks to a beam index given the number of cycled beams and associating beams with the number of random access channel occasions of the random access channel occasion group; identifying a random access channel occasion group associated with the beam index; selecting at least one preamble associated with the beam index in the random access channel occasion group; and transmitting the at least one preamble within each of the number of random access channel occasions of the random access channel occasion group to perform a random access channel procedure.

According to a fourth aspect of the present invention, an apparatus comprising: means for receiving information comprising a random access channel configuration and a number of cycled beams; means for determining a number of random access channel occasions for a random access channel occasion group; means for transforming synchronization signal blocks to a beam index given the number of cycled beams and associating beams with the number of random access channel occasions of the random access channel occasion group; means for identifying a random access channel occasion group associated with the beam index; means for selecting at least one preamble associated with the beam index in the random access channel occasion group; and means for transmitting the at least one preamble within each of the number of random access channel occasions of the random access channel occasion group to perform a random access channel procedure.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 6A shows a table showing relationship between slot index, SSB index for timing, PBCH DMRS sequence and beam index;

DETAILED DESCRIPTION

Figure 1:
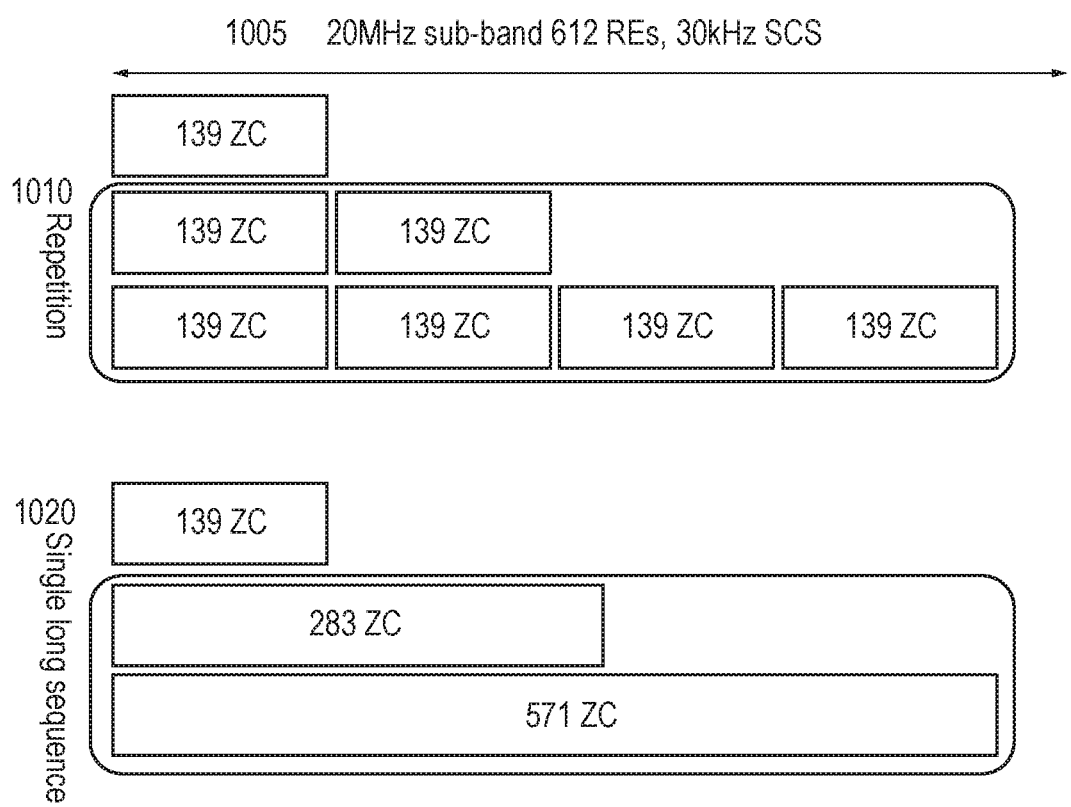
FIG. 1 shows alternatives to make half and full subband PRACH in accordance with example embodiments of the invention.

Example embodiments of this invention relate to a Random Access Channel (RACH) resource allocation for a repetition transmission mode and association to Synchronization Signal and PBCH blocks (SS/PBCH).

Example embodiments of the invention provide a 3GPP New Radio (NR) physical layer design. There is in accordance with example embodiments of the invention a design which may be performed by an apparatus with focus on Random Access Channel (RACH) resource allocation and association to Synchronization Signal and PBCH blocks (SS/PBCH).

Example embodiments of the invention relate to NR-Unlicensed operation in FR1 and FR2 and subsequent descriptions are discussed in that context but example embodiments of the invention can be used also in other use cases. Other use cases maybe e.g. NR operation above 52.6 GHz where first target deployment scenario would be unlicensed operation in 60 GHz unlicensed bands.

Certain operations for RAN related to NR-Based Access to Unlicensed Spectrum has been approved at the time of this application. For this a new WID related to NR-Based Access to Unlicensed Spectrum has also been approved, starting a specifications phase for a next release.

The approvals as mentioned above include the following physical layer aspects to be specified related to RACH:

---

Detailed objectives of the work item are the following:
According to the outcome of the study item, the NR-U should specify the followings [TR38.889]:
    Physical layer aspects including [RAN1]:
    . . .
        PRACH including possible extension of PRACH format(s) in line with agreements during the SI phase (TR 38.889, Section 7.2.1.2) to support minimum bandwidth requirement given by regulation. Determine the applicability of Rel-15 NR formats to NR-U operation.RAN1 should decide whether 60 kHz subcarrier spacing for PRACH is supported, based on a unified design with 15 kHz and 30 kHz PRACH for meeting occupied channel bandwidth (OCB) requirements.

---

Regarding these such approvals down-scoping of features has been agreed to. A relevant scope agreed for this may include the following:

Essential:

Wideband PRACH design (long sequence vs repetition);

Supported PRACH formats (legacy PRACH and new PRACH);

RMSI PDSCH to SSB rate matching (impacted by RAN4 sync raster decision, if the decision does not guarantee SSB placement at the edge of the initial DL BWP):

Also impact default PDSCH SLIV table configuration;

RMSI (PLMN) transmission in Scell.

Optimizations:

CSI-RS FDM with SSB (impacted by RAN4 sync raster decision);

Additional PRACH numerology;

Multiplexing of PRACH and other channels;

Whether to introduce LBT gap between ROs.

PRACH Design in NR-U

A status in NR-U at the time of this application is that new radio (NR) length-139 short sequence is supported as well as PRACH formats A, B and C (short sequence formats) are supported. In addition, a new enhanced design of NR-U PRACH aims at defining PRACH preamble having bandwidth of half and full subband where subband size is 20 MHz. There are two alternative approaches (repetition of length-139 sequence and a single long sequence) as agreed to.

For a new enhanced design of NR-U PRACH in addition to the Rel-15 design (sequence length of 139) further discussion is limited to the following options:

ZC sequence of the following lengths:
        15 kHz: Choose one of L_RA = [571, 1151],
        30 kHz: Choose one of L_RA = [283, 571];
    Repetition of Rel-15 PRACH sequences in frequency domain with potentially some mechanisms to improve the cubic metric:
        Consider one of 2 and 4 repetitions for 30 kHz and one of 4 and 8 repetitions for 15 kHz;
        Note: Decision will be based on previously agreed evaluation metrics, capacity per cell (i.e., number of preambles per RACH occasion and number of RACH occasions) for the same time and frequency resources, specification impact and implementation complexity;
        Note: Companies should state any deviations in assumptions from the agreed evaluation assumptions.

General RACH Design in NR

Random Access preambles are transmitted in PRACH Occasions (ROs). RO defines a time-frequency resource such as for a single transmission used to transmit the preamble. FIG. 1 illustrates alternatives for providing half and full subband PRACHs. As shown in FIG. 1 there is a 20 MHz sub-band 1005 with 612 RE's using a 30 kHz SCS. Blocks 1010 of FIG. 1 show Repetition and blocks 1020 of FIG. 1 show a single long sequence.

For the Random Access preambles are transmitted in PRACH Occasions (ROs), each RO has up to 64 preambles (total number of number of preambles including contention based and contention free preambles per RO is configurable by RRC). The first preamble, i.e. preamble index 0, corresponds to cyclic shift 0 of the logic root sequence index given by higher layer parameter prach-RootSequenceIndex. Subsequent preamble indices are numbered first in increasing order of cyclic shift, and then increasing order of logical root indices, until all 64 preamble indices are obtained.

As agreed PRACH occasions can be frequency division multiplexed in the frequency domain, the number of PRACH frequency resources multiplexed in the same time domain PRACH occasion is given by higher layer parameter msg1-FDM=M. A current release at the time of this application supports up to 8 Frequency Division Multiplexed (FDMed) ROs:

```
RACH-ConfigGeneric ::= SEQUENCE {
    prach-ConfigurationIndex INTEGER (0..255),
    msg1-FDM ENUMERATED {one, two, four, eight},
    msg1-FrequencyStart INTEGER
        (0..maxNrofPhysicalResourceBlocks-1),
    zeroCorrelationZoneConfig INTEGER(0..15),
    preambleReceivedTargetPower INTEGER (-202..-60),
    preambleTransMax ENUMERATED {n3, n4, n5, n6, n7, n8,
        n10, n20, n50, n100, n200},
    powerRampingStep ENUMERATED {dB0, dB2, dB4, dB6},
    ra-ResponseWindow ENUMERATED {sl1, sl2, sl4, sl8,
        sl10, sl20, sl40, sl80},
    ...}
    msg1-FDM
```
The number of PRACH transmission occasions FDMed in one time instance.

Figure 2:
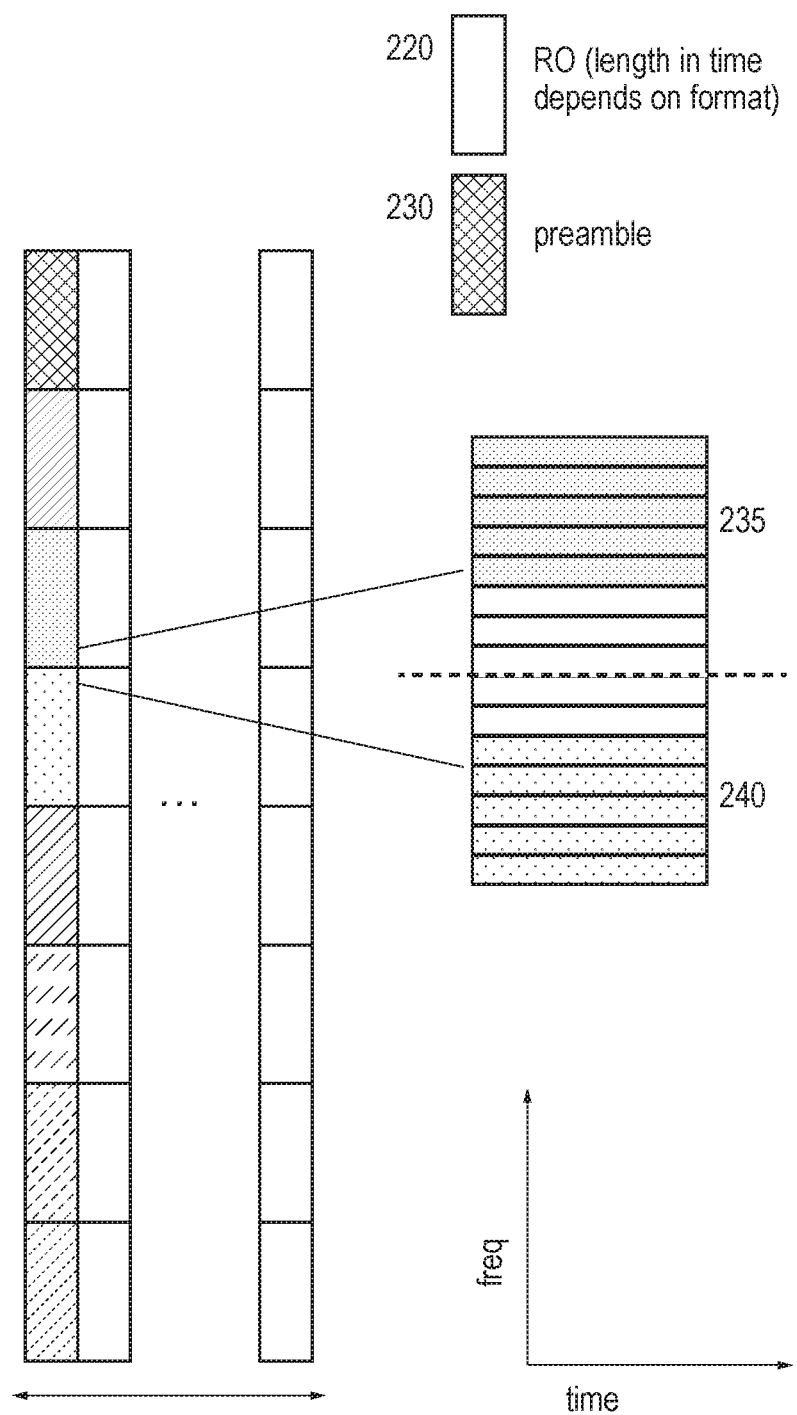
FIG. 2 shows RACH configuration with 8 RACH occasions frequency division multiplexed.

Frequency Division Multiplexed ROs are allocated consecutively in frequency as shown in FIG. 2. FIG. 2 shows a RACH configuration with 8 ROs frequency division multiplexed (FDMed). FIG. 2 shows a sequence with ROs 220 where a length of time depends on format, and shows preamble 230. FIG. 2 also shows a gap of 5 sub-carriers between sequence 235 and sequence 240 mapped in neighbouring PRACH occasions.

In certain operations UE transmits preamble in one RO (based on SSB association) while gNB detects preambles in each configured Frequency Division Multiplexed RO. Thus, from implementation perspective defining new PRACH preamble based on repetitions where each repetition follows the sequence mapping onto REs from the accepted standard at the time of this application would be preferred.

To support beamformed initial access an association framework between PRACH ROs/preambles and the SS/PBCH blocks is defined. Before entering the random access procedure the UE detects and measures SSBs of the selected cell (initial access), and selects the SSB that is strong enough (above certain threshold). In the random access procedure, the UE randomly selects a preamble in the RACH Occasion associated with the selected SS/PBCH block representing the downlink beam the UE wants to be served with. Each SS/PBCH block can be associated to one or up to eight consecutive ROs. Furthermore, multiple SS/PBCH blocks can be associated to one RO in which preambles are divided among the SS/PBCH blocks. In that case, SS/PBCH block cannot be associated to multiple consecutive ROs.

QCL of SSBs in NR-U SSB Burst

In order to support SSB burst transmission in NR-U under uncertainty due to LBT (listen-before-talk) failures (transmitting node determines that transmission resources occupied by some other transmitter by listening the resources prior intended transmission time) the NR-U considers cycling of SSBs as shown in the Table of FIG. 6A. It means that certain beam has multiple transmission possibilities within the certain time period (10 slots). UE determines beams index from the detected SSB index/PBCH DMRS sequence and Q (maximum number of beam indices in the serving cell/the maximum number of SSB/beam positions cycled in a DRS burst) via the following formula: beam index=mod(PBCH DMRS sequence index, Q).

The following values of Q are supported: {1, 2, 4, 8}. In other words, compared to NR R15, in NR-U beams are cycled to cover for LBT failure, such when gNB obtains access to channel in any of the slots of DRS window, it may cycle over all SSB/beams.

Reference is made to FIG. 6A which shows a Table of Relationship between slot index, SSB index for timing, PBCH DMRS sequence and beam index. As shown in FIG. 6A the Table shows a slot index #n, ssb index, and PBCH DMRS sequence rows. These rows include Q=n indicators with regards to a beam index, where n is an integer.

In standards at the time of this application an association between SS/PBCH blocks and ROs/PRACH preambles is configured via RRC parameter:

ssb-perRACH-OccasionAndCB-PreamblesPerSSB:

The meaning of this field can be twofold: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB*max (1, SSB-per-rach-occasion).

Figure 3:
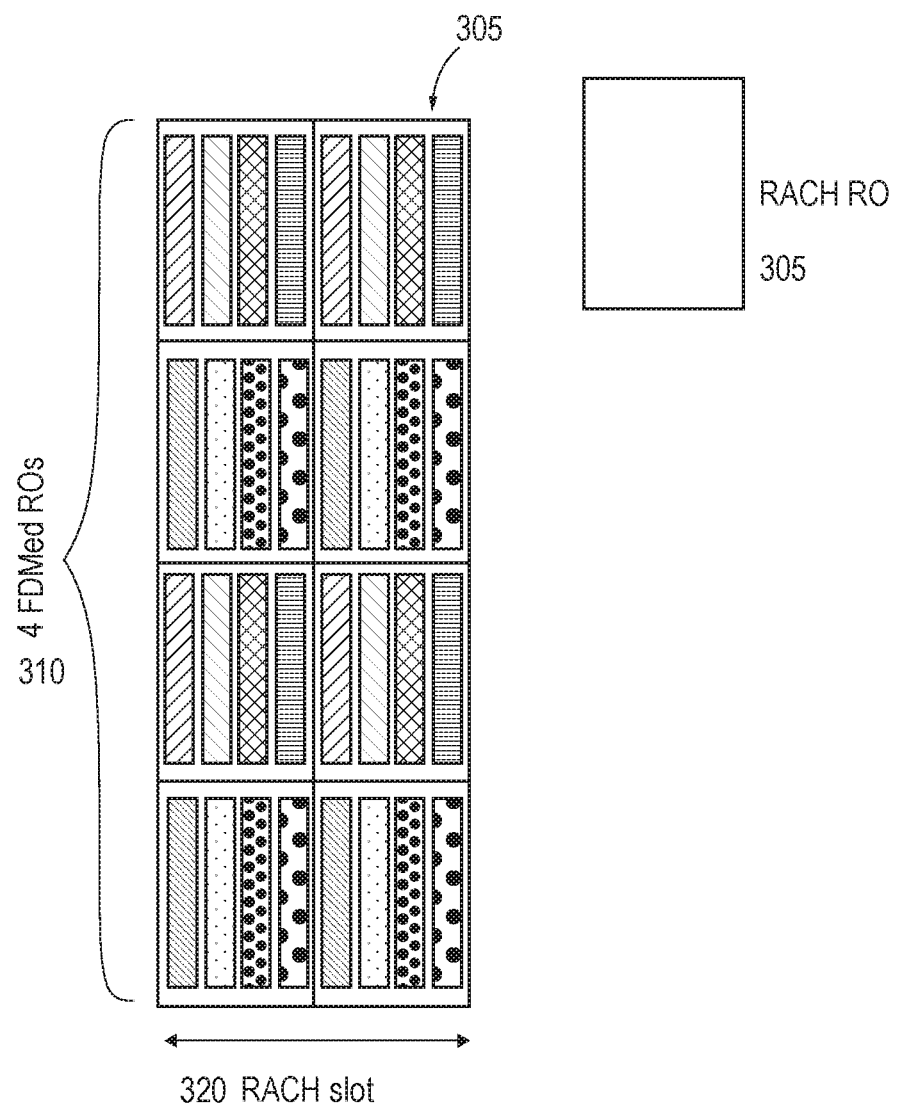
FIG. 3 shows a configuration example of a RACH.

FIG. 3 shows a configuration example of a RACH with RACH RO 305. As shown in FIG. 3 there is a sequence of 4 FDMed ROs 310 frequency division multiplexed over RACH slot 320.

One possible configuration is illustrated in FIG. 3 where we assume that there are 8 SSBs, and 4 ROs Frequency Division Multiplexed (in order to have resource allocation for either 2× half subband PRACH transmission or 1 full subband PRACH transmission) and 2 ROs TDMed in the RACH slot (Format A3 in use). Further we assume that there are 4 SSBs per RO and 16 contention based preambles per SSB (preambles per SSB are described using different patterns). The preambles associated for 8 SSBs would be mapped to ROs as in FIG. 3.

It can be observed that it's not straightforward to apply repetition scheme upon Rel15 SSB to RO association and resource allocation framework e.g. when gNB is able to receive PRACHs from multiple directions (associated to multiple SSBs). That is assumed to be gNB's (preferred) capability especially in FR1 (digital (beamforming) architecture).

Furthermore, SSB to RACH occasion/preamble association does not take into account SSB index to beam index transformation used in NR-U.

Thus, one problem to be solved is that how to define the association between ROs and SSBs in a way that PRACH transmission based on repetition can be performed. In addition, it's not defined how to take into mapping from multiple SSB indices to a single beam index in RACH occasion/preamble selection by the UE.

Figure 7:
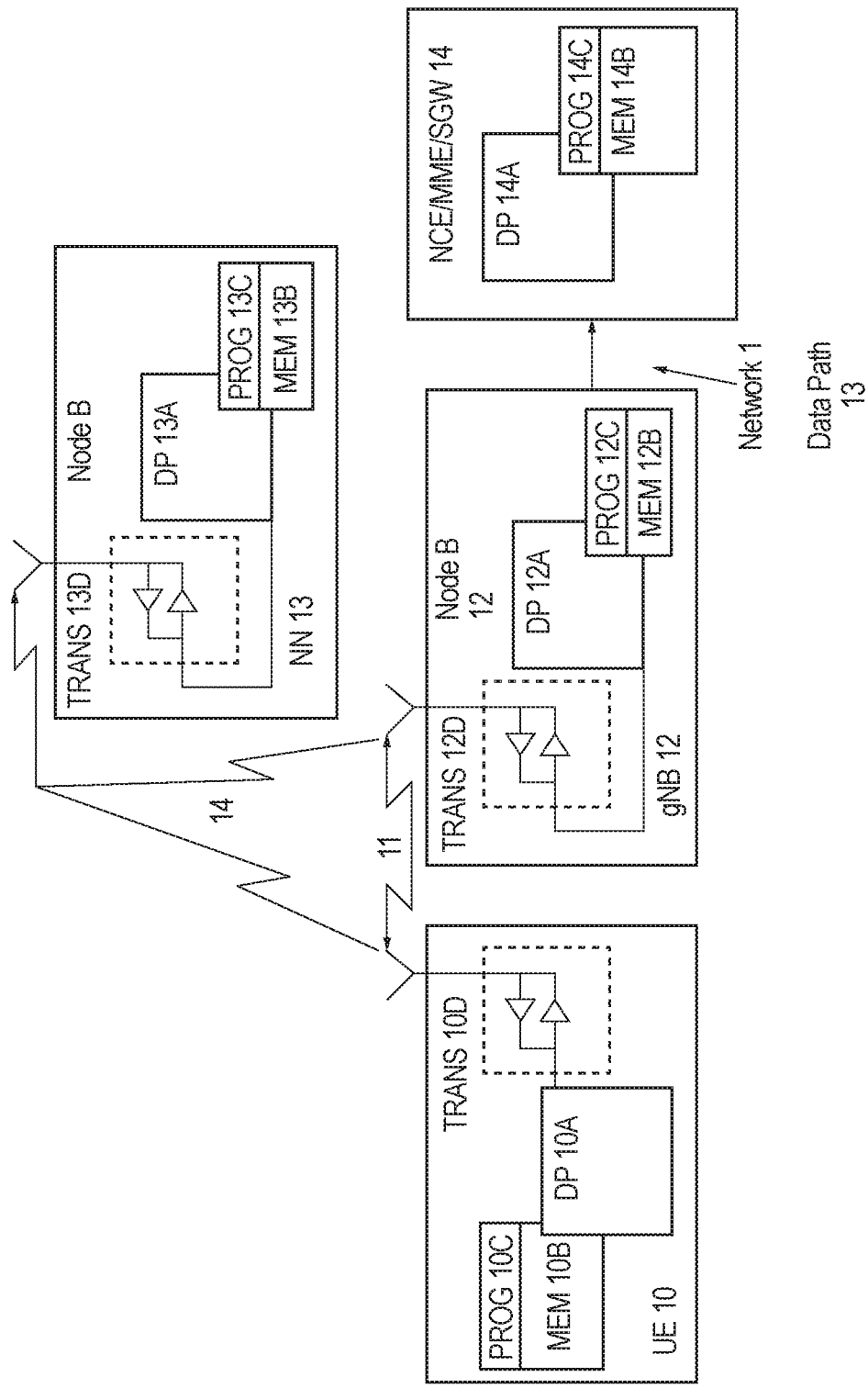
FIG. 7 shows a high level block diagram of various devices used in carrying out various aspects of the invention.

Before describing the example embodiments of the invention in detail, reference is made to FIG. 7 for illustrating a simplified block diagram of various electronic devices that are suitable for use in practicing the example embodiments of this invention.

FIG. 7 shows a block diagram of one possible and non-limiting exemplary system in which the example embodiments of the invention may be practiced. In FIG. 7, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to gNB 12 and NN 13, respectively. The one or more memories MEM 10B include computer program code PROG 10C. The UE 10 communicates with gNB 12 and/or NN 13 via a wireless link 111.

The gNB 12 (NR/5G Node B or possibly an evolved NB) is a base station such as a master or secondary node base station (e.g., for NR or LTE long term evolution) that communicates with devices such as NN 13 and UE 10 of FIG. 7. The gNB 12 provides access to wireless devices such as the UE 10 to the wireless network 1. The gNB 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE/MME/SGW 14 of FIG. 7.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW 14 of FIG. 7. The NCE/MME/SGW 14 including MME (Mobility Management Entity)/SGW (Serving Gateway) functionality, such as User Plane Functionalities, and/or an Access Management functionality for LTE and similar functionality for 5G.

The one or more buses of the device of FIG. 7 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 7 shows a network node or base station such as the gNB 12 as in FIG. 7 and mobility management device such as the NN 13 as in FIG. 7, these devices can incorporate or be incorporated into an eNodeB or eNB or gNB such as for LTE and NR, and would still be configurable to perform example embodiments of the invention as described in this application.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE/MME/SGW) 14 that may include NCE (Network Control Element), MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE/MME/SGW 14. In addition, it is noted that the operations in accordance with example embodiments of the invention, as performed by the NN 13, may also be performed at the NCE/MME/SGW 14.

The NCE/MME/SGW 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10A, DP12A, DP13A, and/or DP14A and memories MEM 10B, MEM 12B, MEM 13B, and/or MEM 14B, and also such virtualized entities create technical effects.

The computer readable memories MEM 10B, MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 10B, MEM 12B, MEM 13B, and MEM 14B may be means for performing storage functions. The processors DP10A, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10A, DP12A, DP13A, and DP14A may be means for performing functions, such as controlling the UE 10, gNB 12, NN 13, NCE/MME/SGW 14 and other functions as described herein.

In accordance with an example embodiment of the invention there is proposed a PRACH transmission resource selection scheme where an SSB index is transformed onto a beam index based on knowledge about number of SSBs used for cycling against LBT failures (Q) and the beam index is used to select the ROG association index representing the beam index position in the pruned list of actually transmitted beams. The RO group (ROG) association index is associated to a set of cloned consecutive ROs forming a ROG from which the UE performs preamble selection.

In example embodiments of invention the following definitions may be used and defined:
Basic RO (RO) follows the RO definition from the standards at the time of this application; and
RO Group (ROG)
In accordance with an example embodiment of the invention an ROG can define a single RO for a singular transmission for example, or an ROG can define a set of ROs and/or a set of time-frequency resources for multiple preamble transmissions. In the latter example the set of ROs can be stacked in frequency.

Example embodiments of invention define ROG with the following properties:
It has the number of ROs either equal to half of the number of ROs of msg1–FDM (when repetition=Half) or equal to full number of ROs of msg1–FDM (when repetition=Full):
When repetition is half there are two ROGs Frequency Division Multiplexed;
When no repetition is configured ROG is equal to RO.
When repetition=half or repetition=full cycled beams are associated to ROGs, i.e. ROs within the ROG are cloned in association wise:
ssb-perRACH-OccasionAndCB-PreamblesPerSSB could indicate in this case that how many beams are associated per ROG and the number of CB preambles per beam.
When no repetition is configured:
ssb-perRACH-OccasionAndCB-PreamblesPerSSB could indicate in this case that how many beams are associated per ROG and the number of CB preambles per beam.

Figure 6B:
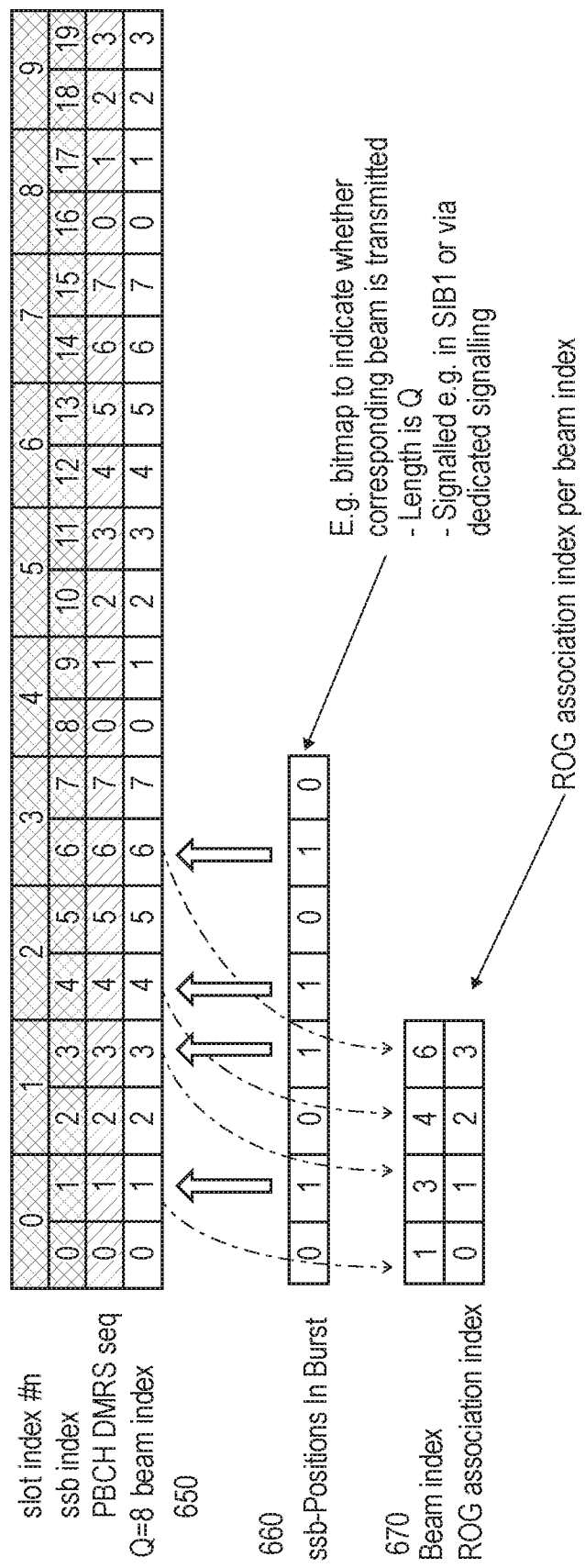
FIG. 6B shows a beam index to ROG taking into account signalling of the actual transmitted beams to associate a beam index to ROG.

Further, a repetition parameter may be defined to get the following values:
Null (Rel15 functionality);
Half (4 ROs with 15 kHz SCS, 2 ROs with 30 kHz SCS); and
Full (8 ROs with 15 kHz SCS, 4 ROs with 30 kHz SCS).
A transform from SSB index to beam index is used:
beam index=mod(PBCH DMRS sequence (or SSB index), Q).
A transform from beam index to ROG association index by taking into signaled information about actually transmitted beams and the actual association is defined between resulting ROG association index and ROG/preamble:
ROG association index is pruned index list of beam indices corresponding to actually transmitted beams FIG. 6B shows a beam index to ROG taking into account signalling of the actual transmitted beams to associate a beam index to ROG. As shown in FIG. 6B the Beam index 650 beams #1, #3, #5, #6 are associated to the Beam index 670. The Beam index 650 has a Q=8. Further, as shown in FIG. 6B each value of the beam index 670 is associated with a ROG association index. In accordance with example embodiments of the invention the associating is taking into account signalling of the actual transmitted beams, which may be different than Q, i.e. set of actual transmitted beams is a subset of Q beams. For example for Q=8 the gNB may transmit e.g., only beams #1, #3, #5, #6. Thus, in accordance with example embodiments of the invention a ROG association index is introduced which is mapped to actually transmitted beams. In accordance with an example embodiment the ROG association index is used for preamble selection (function of beam index). Further, as shown in FIG. 6B there can be a bitmap and/or signalling to indicate whether corresponding beam is transmitted and a Length is Q. This bitmap or signalling can be communicated via an information block such as an SIB1 or via dedicated signalling. Only first Q bits of the bitmap may be relevant to the UE.

In example embodiments of invention:
UE determines whether or not repetition is used for PRACH transmission;
Upon determining that repetition is used the UE determines either half or full repetition mode is in use:
In case of half, UE determines ROG being half of the ROs defined by msg1-FDM. Note! msg1-FDM needs to be 4 with 15 kHz and 2 with 30 kHz SCS,
In case of full, UE determines ROG being the ROs defined by msg1-FDM. Note! msg1-FDM needs to be 8 with 15 kHz and 4 with 30 kHz SCS;
UE interprets ssb-perRACH-OccasionAndCB-PreamblesPerSSB so that properties of the ROs within the ROG are the same (ROs are cloned inside the ROG) and that number of SSBs per RO means the number of beam indices (transformed from SSBs) per RO within the ROG as well as that #CB preambles per SSB means #CB preambles per beam index;
UE selects the ROG based on ROG association index (instead of SSB index association), e.g., UE first detects and measures SSBs, then selects the one that is strong enough and transforms the selected SSB index to beam index.
Then UE selects the ROG of which ROs are associated to the selected beam index based on determined ROG association index:
transformation is performed using beam-index=mod (SSB-index, Q), i.e. SSB-indices with the same mod (SSB-index,Q) are associated with the same ROG, where Q is number of cycled beams:
ROG association indices correspond to pruned beam indices corresponding to actually transmitted beams
UE selects the same preamble in each RO of the selected ROG among the preambles associated to the selected beam index;
UE transmits the preamble in each RO simultaneously
In order to limit cubic metric/PAPR there may be predefined phase ramp and/or common phase shift is applied "differentially and cumulatively" between neighboring ROs, e.g., [0×shift, 1×shift, 2×shift, 3×shift].

Alternatively, in accordance with an example embodiments of the invention a UE may select a predetermined combination of preambles among preambles associated with the beam index in the selected random access channel occasion group. For example, each RO in ROG has first four preambles associated to beam index #0. UE selects beam index #0. Further assume four ROs in ROG. In one example UE could select e.g. in first RO preamble #0, in second RO preamble #1, in third RO preamble #0 and in fourth RO preamble #1. If UE selects e.g. preamble #1 in the first RO. It would then select preamble #0 in second RO, preamble #1 in third RO and preamble #0 in fourth RO.

In one alternative embodiment, the UE determines SSBs that correspond to the selected beam index and selects RO/preamble for the transmission among the ROs/preambles corresponding to the said SSBs.

UE steps to implement certain example embodiments of invention:
1. UE receives RACH configuration to be used in the serving cell;
2. From the RACH configuration UE reads whether or not repetition is used and from MIB/RMSI UE reads Q;
3. In case repetition is used the UE determines ROG:
   a. being half of the number of ROs of msg1-FDM,
   b. being the number of ROs of msg1-FDM;
4. UE determines from RACH configuration and Q how beam indices are associated to ROGs:
   a. Association between beam indices and ROs inside the ROG are identical to each other (ROs are cloned version from each other in association wise);
5. UE selects the ROG based on selected beam index (based on selected SSB index, transform to beam index and transform beam index to ROG association index per beam index);
6. UE selects the preambles (same preamble in each RO belonging to the same selected ROG) based on selected beam index;
7. UE transmits simultaneously the selected preamble in each RO belonging to the selected ROG:
   a. In order to limit cubic metric/PAPR there may be predefined phase ramp and/or common phase shift applied for each preamble in the RO.

Figure 4:
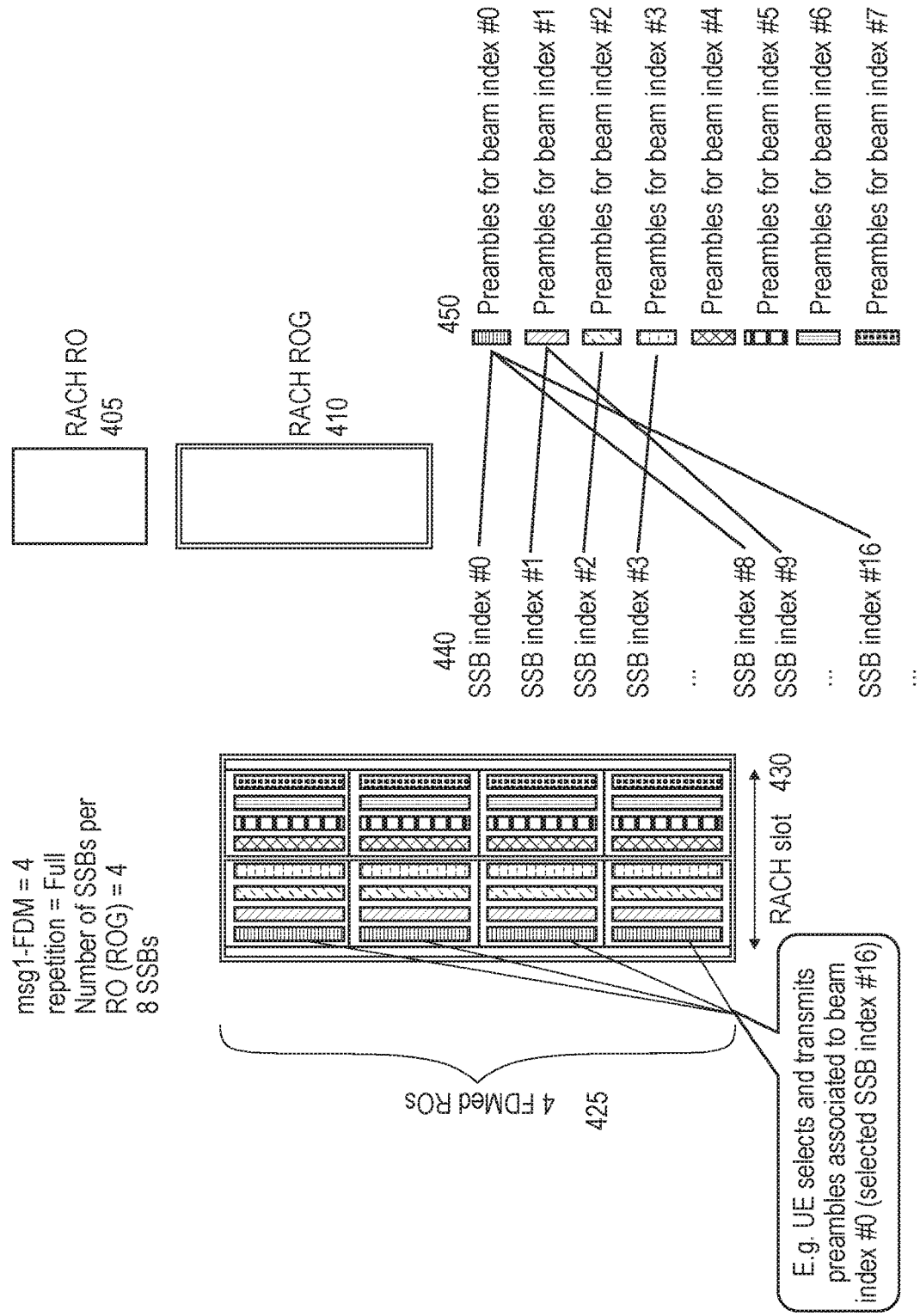
FIG. 4 shows an example configuration in accordance with example embodiments of the invention.
Figure 5:
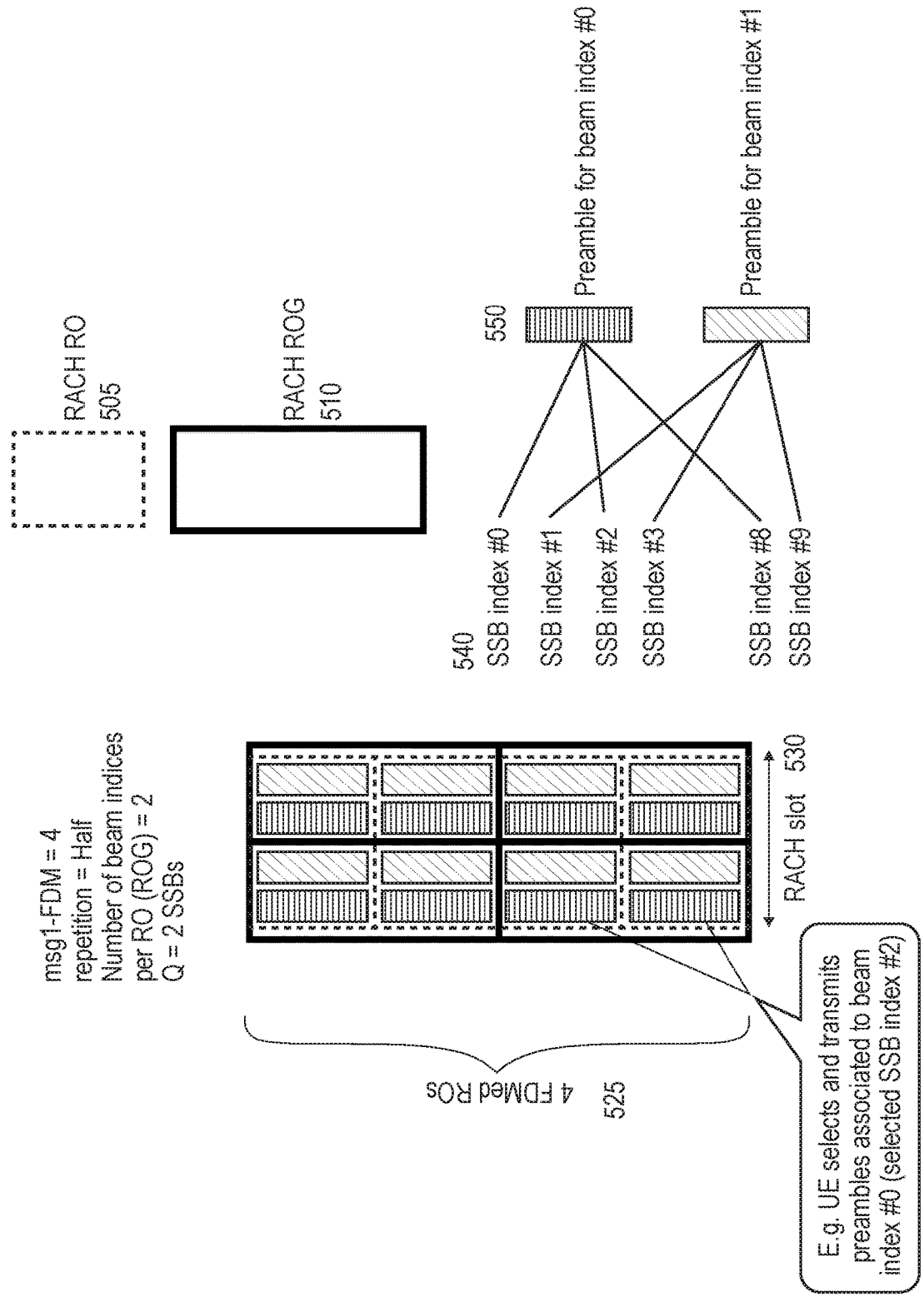
FIG. 5 shows another example configuration in accordance with example embodiments of the invention.

In the following, a couple of example RACH configurations are illustrated to show how ROGs are defined and how association is provided between beam index transformed from the SSB index to ROs in cases where Q equals to 8, number of beam indices per RO (ROG) is four and full subband transmission (example configuration as in FIG. 4) and where Q equals to 2, number of beam indices per RO (ROG) is 2 and half subband transmission (another example configuration as shown in FIG. 5).

FIG. 4 shows an example configuration in accordance with example embodiments of the invention. FIG. 4 shows RACH RO 405 and RACG ROG 410. In FIG. 4 there is shown a sequence of 4 FDMed ROs 425 frequency division multiplexed over RACH slots 430. FIG. 4 also shows a relationship between the SSB indexes 440 and Preambles for beam indexes 450.

FIG. 5 shows another example configuration in accordance with example embodiments of the invention. FIG. 5 shows RACH RO 405 and RACG ROG 410. In FIG. 4 there is shown a sequence of 4 FDMed ROs 525 frequency division multiplexed over RACH slots 530. FIG. 5 also shows a relationship between the SSB indexes 540 and Preambles for beam indexes 550.

Figure 8:
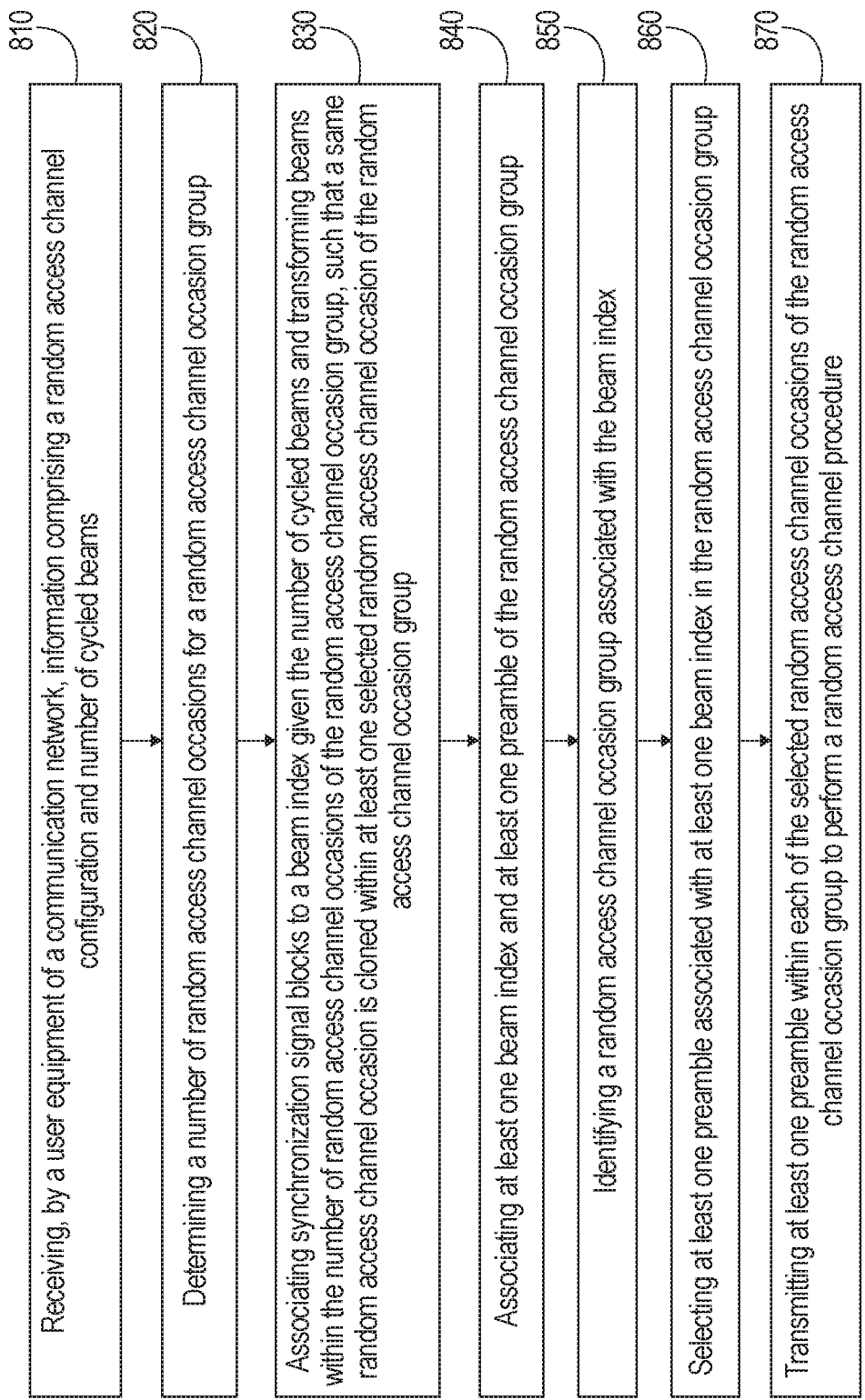
FIG. 8 shows a method in accordance with example embodiments of the invention which may be performed by an apparatus.

FIG. 8 shows a method in accordance with example embodiments of the invention which may be performed by an apparatus. FIG. 8 illustrates operations which may be performed by a device such as, but not limited to, a device associated with the UE 10, gNB 12, and/or NN 13 as in FIG. 7.

As shown in step 810 of FIG. 8 there is receiving, by a user equipment of a communication network, information comprising a random access channel configuration and number of cycled beams. As shown in step 820 of FIG. 8 there is determining a number of random access channel occasions for a random access channel occasion group.

Shown in step 830 of FIG. 8 there is associating synchronization signal blocks to a beam index given the number of cycled beams and transforming beams within the number of random access channel occasions of the random access channel occasion group, such that a same random access channel occasion is cloned within at least one selected random access channel occasion of the random access channel occasion group; at step 840 of FIG. 8 there is associating at least one beam index and at least one preamble of the random access channel occasion group. In step 850 of FIG. 8 there is identifying a random access channel occasion group associated with the beam index. As shown in step 860 of FIG. 8 there is selecting at least one preamble associated with the at least one beam index in the random access channel occasion group. Then as shown in step 870 of FIG. 8 there is transmitting at least one preamble within each of the number of random access channel occasions of the random access channel occasion group to perform a random access channel procedure.

In accordance with the example embodiments as described in the paragraph above, wherein the random access channel occasion group is identified based on the information that one of a half repetition or full repetition is used for the random access channel configuration.

In accordance with the example embodiments as described in the paragraphs above, wherein when repetition is not configured the random access channel occasion group is equal to a random access channel occasion.

In accordance with the example embodiments as described in the paragraphs above, wherein the random access channel occasion group comprises more than one random access channel occasion.

In accordance with the example embodiments as described in the paragraphs above, wherein the at least one preamble associated with the at least one beam index comprises the same preamble within each random access channel occasion of random access channel occasion group associated with the beam index.

In accordance with the example embodiments as described in the paragraphs above, wherein the associating synchronization signal blocks to beam index is based on synchronization signal block index.

In accordance with the example embodiments as described in the paragraphs above, wherein the association is performed by mapping beams one-by-one in to preambles of random access channel occasion groups, code-first, time-second and frequency third.

In accordance with the example embodiments as described in the paragraphs above, wherein the set of cycled beams comprises a determined subset of beams, wherein the beams are defined by at least one value Q, and wherein the at least one value Q comprises an indication of at least one of a maximum number of cycled beam indices in serving cell, a maximum number of synchronization signal blocks, and maximum number of beam positions cycled in a Discovery Reference Signal burst.

In accordance with the example embodiments as described in the paragraphs above, wherein determining the number of random access channel occasions for the random access channel occasion group is using a number of the one of a half repetition or a full repetition.

In accordance with the example embodiments as described in the paragraphs above, wherein the determined subset of beams comprises at least one beam for which at least one SSB is indicated as transmitted.

In accordance with the example embodiments as described in the paragraphs above, wherein the identifying that one of a half repetition or full repetition is used for the random access channel configuration comprises identifying a number of synchronization signal blocks per random access channel occasion group of the random access channel occasion group, and a number of channel bandwidth preambles per the number of synchronization signal blocks.

In accordance with the example embodiments as described in the paragraphs above, wherein a selected beam is based on a signal strength of at least one synchronization signal block of the number of synchronization signal blocks exceeding a threshold.

In accordance with the example embodiments as described in the paragraphs above, wherein the information is received from a network node of a communication network.

In accordance with the example embodiments as described in the paragraphs above, wherein the information comprises random access channel configuration to be used in a serving cell for the user equipment.

A non-transitory computer-readable medium (MEM 12B, MEM 13B, and/or MEM 10B as in FIG. 7) storing program code (PROG 12C, PROG 13C, and/or PROG 10C as in FIG. 7), the program code executed by at least one processor (DP 12A, DP 13A, and/or DP 10A as in FIG. 7) to perform the operations as at least described in the paragraphs above.

In accordance with an example embodiment of the invention as described above there is an apparatus comprising: means for receiving (TRANS 12D, TRANS 13D, and/or TRANS 10D, MEM 12B, MEM 13B, and/or MEM 10B, PROG 12C, PROG 13C, and/or 10C, DP 12A and/or 10A as in FIG. 7), by a user equipment (UE 10, gNB 12, and/or NN 13 as in FIG. 7) of a communication network (Network 1 as in FIG. 7), information comprising a random access channel configuration and number of cycled beams; means for determining (TRANS 12D, TRANS 13D, and/or TRANS 10D, MEM 12B, MEM 13B, and/or MEM 10B, PROG 12C, PROG 13C, and/or 10C, DP 12A and/or 10A as in FIG. 7) a number of random access channel occasions for a random access channel occasion group; means for associating (TRANS 12D, TRANS 13D, and/or TRANS 10D, MEM 12B, MEM 13B, and/or MEM 10B, PROG 12C, PROG 13C, and/or 10C, DP 12A and/or 10A as in FIG. 7) synchronization signal blocks to a beam index given the number of cycled beams and means for transforming (TRANS 12D, TRANS 13D, and/or TRANS 10D, MEM 12B, MEM 13B, and/or MEM 10B, PROG 12C, PROG 13C, and/or 10C, DP 12A and/or 10A as in FIG. 7) beams within the number of random access channel occasions of the random access channel occasion group, such that a same random access channel occasion is cloned within at least one selected random access channel occasion of the random access channel occasion group; means for associating at least one beam index and at least one preamble of the random access channel occasion group; means for identifying (TRANS 12D, TRANS 13D, and/or TRANS 10D, MEM 12B, MEM 13B, and/or MEM 10B, PROG 12C, PROG 13C, and/or 10C, DP 12A and/or 10A as in FIG. 7) a random access channel occasion group associated with the beam index; means for selecting at least one preamble associated with the at least one beam index in the random access channel occasion group; and means for transmitting (TRANS 12D, TRANS 13D, and/or TRANS 10D, MEM 12B, MEM 13B, and/or MEM 10B, PROG 12C, PROG 13C, and/or 10C, DP 12A and/or 10A as in FIG. 7) at least one preamble within each of the number of random access channel occasions of the random access channel occasion group to perform a random access channel procedure.

In the example aspect of the invention according to the paragraph above, wherein at least means for receiving, identifying, determining, selecting, associating, and transmitting comprises transceiver [TRANS 12D, TRANS 13D, and/or TRANS 10D as in FIG. 7] a non-transitory computer readable medium [MEM 12B, MEM 13B, and/or MEM 10B as in FIG. 7] encoded with a computer program [PROG 12C, PROG 13C, and/or PROG 10C as in FIG. 7] executable by at least one processor [DP 12A, DP 13A, and/or DP 10A as in FIG. 7].

It is noted that advantages of operations in accordance with example embodiments of invention include at least that there is provided a missing functionality to provide RACH resources for repetition transmission mode as well as provides RACH resources that can be associated to beam indices while SSBs may be transmitted in cycled manner to overcome LBT failures.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving, by a user equipment of a communication network, information comprising a random access channel configuration and a number of cycled beams;
   determining a number of random access channel occasions for a random access channel occasion group;
   transforming synchronization signal blocks to a beam index given the number of cycled beams and associating beams with the number of random access channel occasions of the random access channel occasion group;
   identifying a random access channel occasion group associated with the beam index;
   selecting at least one preamble associated with the beam index in the random access channel occasion group; and
   transmitting the at least one preamble within each of the number of random access channel occasions of the random access channel occasion group to perform a random access channel procedure.

2. The method according to claim 1, wherein the random access channel occasion group is identified based on whether a half repetition or full repetition is used for the random access channel configuration.

3. The method according to claim 1, wherein when repetition is not configured the random access channel occasion group is equal to a random access channel occasion.

4. The method according to claim 1, wherein the random access channel occasion group comprises more than one random access channel occasion, wherein the at least one preamble associated with the beam index comprises the same preamble within each random access channel occasion of random access channel occasion group associated with the beam index.

5. The method according to claim 1, wherein the transforming synchronization signal blocks to beam index is based on synchronization signal block index.

6. The method according to claim 1, further comprising: associating at least one beam index and at least one preamble of the random access channel occasion group by mapping the at least one beam index one-by-one in to preambles of random access channel occasion groups.

7. The method according to claim 6, wherein mapping the at least one beam index one-by-one in to preambles of random access channel occasion groups is performed with the order of code-first, time-second and frequency third.

8. The method according to claim 1, wherein the number of cycled beams comprises an indication of at least one of: a maximum number of cycled beam indices in serving cell, a maximum number of synchronization signal blocks, and a maximum number of beam positions cycled in a Discovery Reference Signal burst.

9. The method according to claim 1, wherein determining the number of random access channel occasions for the random access channel occasion group is based on half repetition or full repetition of the random access channel configuration.

10. An apparatus comprising:
at least one processor; and
at least one memory including computer program code, where the at least one memory and the computer program code are configured, with the at least one processor, to cause the apparatus to at least:
receive information comprising a random access channel configuration and a number of cycled beams;
determine a number of random access channel occasions for a random access channel occasion group;
transform synchronization signal blocks to a beam index given the number of cycled beams and associate beams with the number of random access channel occasions of the random access channel occasion group;
identify a random access channel occasion group associated with the beam index;
select at least one preamble associated with the beam index in the random access channel occasion group; and
transmit the at least one preamble within each of the number of random access channel occasions of the random access channel occasion group to perform a random access channel procedure.

11. The apparatus according to claim 10, wherein the random access channel occasion group is identified based on whether a half repetition or full repetition is used for the random access channel configuration.

12. The apparatus according to claim 10, wherein when repetition is not configured the random access channel occasion group is equal to a random access channel occasion.

13. The apparatus according to claim 10, wherein the random access channel occasion group comprises more than one random access channel occasion, wherein the at least one preamble associated with the beam index comprises the same preamble within each random access channel occasion of random access channel occasion group associated with the beam index.

14. The apparatus according to claim 10, wherein the transforming synchronization signal blocks to beam index is based on synchronization signal block index.

15. The apparatus according to claim 10, further comprising: associating at least one beam index and at least one preamble of the random access channel occasion group by mapping the at least one beam index one-by-one in to preambles of random access channel occasion groups.

16. The apparatus according to claim 15, wherein mapping the at least one beam index one-by-one in to preambles of random access channel occasion groups is performed with the order of code-first, time-second and frequency third.

17. The apparatus according to claim 10, wherein the number of cycled beams comprises an indication of at least one of: a maximum number of cycled beam indices in serving cell, a maximum number of synchronization signal blocks, and a maximum number of beam positions cycled in a Discovery Reference Signal burst.

18. The apparatus according to claim 10, wherein determining the number of random access channel occasions for the random access channel occasion group is based on half repetition or full repetition of the random access channel configuration.

19. A non-transitory computer storage medium encoded with a computer program, the program comprising instructions that when executed by one or more computers cause the one or more computers to perform operations comprising:
receiving, by a user equipment of a communication network, information comprising a random access channel configuration and a number of cycled beams;
determining a number of random access channel occasions for a random access channel occasion group;
transforming synchronization signal blocks to a beam index given the number of cycled beams and associating beams with the number of random access channel occasions of the random access channel occasion group;
identifying a random access channel occasion group associated with the beam index;
selecting at least one preamble associated with the beam index in the random access channel occasion group; and
transmitting the at least one preamble within each of the number of random access channel occasions of the random access channel occasion group to perform a random access channel procedure.

20. The storage medium according to claim 19, wherein when repetition is not configured the random access channel occasion group is equal to a random access channel occasion.

* * * * *